(12) United States Patent
Scheper et al.

(10) Patent No.: US 10,713,927 B2
(45) Date of Patent: *Jul. 14, 2020

(54) SOUND DETECTION AND ALERT SYSTEM FOR A WORKSPACE

(71) Applicant: Steelcase Inc., Grand Rapids, MI (US)

(72) Inventors: Robert Scheper, Grand Rapids, MI (US); Matthew Warner, East Grand Rapids, MI (US); Karl Mead, Grand Rapids, MI (US); Brett Kincaid, Ada, MI (US); Kurt Heidmann, Grand Rapids, MI (US)

(73) Assignee: STEELCASE INC., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,198

(22) Filed: Sep. 12, 2019

(65) Prior Publication Data

US 2020/0005624 A1    Jan. 2, 2020

Related U.S. Application Data

(63) Continuation of application No. 16/144,775, filed on Sep. 27, 2018, now Pat. No. 10,453,326, which is a
(Continued)

(51) Int. Cl.
*H04M 3/40*       (2006.01)
*H04R 29/00*      (2006.01)
(Continued)

(52) U.S. Cl.
CPC ............... *G08B 23/00* (2013.01); *G01H 3/10* (2013.01); *G08B 21/182* (2013.01); *H04R 29/00* (2013.01); *H04R 29/008* (2013.01); *H04S 7/40* (2013.01)

(58) Field of Classification Search
CPC ...... G08B 23/00; G08B 21/182; H04R 29/00; H04R 29/008; G01H 3/10; H04S 7/40; H04M 3/40
(Continued)

(56) References Cited

U.S. PATENT DOCUMENTS 3,200,899 A    8/1965  Krauss
3,304,368 A    2/1967  Ford et al.
(Continued)

OTHER PUBLICATIONS

PCT International Search Report and Written Opinion, PCT/US2014/040805, dated Oct. 22, 2014, 11 pages.

*Primary Examiner* — Vivian C Chin
*Assistant Examiner* — Ubachukwu A Odunukwe
(74) *Attorney, Agent, or Firm* — Quarles & Brady LLP

(57) ABSTRACT

A workspace assembly includes a plurality of sound sensors including at least first and second sound sensors located in first and second spaces within a facility, respectively, at least one communication device located within one of the first space and the second space, and a processor in communication with the sound sensors and the communication device, the processor adapted to compare at least some characteristic of the sounds in at least a subset of the plurality of spaces to identify a particular space from which the sound emanates and to compare at least some characteristic of the sound emanating from the particular space to at least one threshold characteristic value and to provide a signal via the at least one communication device based on the results of the comparison.

52 Claims, 6 Drawing Sheets

Related U.S. Application Data continuation of application No. 15/720,461, filed on Sep. 29, 2017, now Pat. No. 10,115,293, which is a continuation of application No. 15/099,113, filed on Apr. 14, 2016, now Pat. No. 9,805,581, which is a continuation of application No. 13/911,654, filed on Jun. 6, 2013, now abandoned.

(51) Int. Cl.
    *G08B 23/00* (2006.01)
    *G01H 3/10* (2006.01)
    *G08B 21/18* (2006.01)
    *H04S 7/00* (2006.01)

(58) Field of Classification Search
    USPC .......................................... 381/59, 58, 57, 56
    See application file for complete search history.

(56) References Cited

U.S. PATENT DOCUMENTS

| | | | |
|---|---|---|---|
| 3,440,349 A | 4/1969 | Gibbs | |
| 3,480,912 A | 11/1969 | Speeth et al. | |
| 3,545,564 A | 12/1970 | Barber | |
| 3,582,671 A | 6/1971 | Ott | |
| 3,597,542 A | 8/1971 | Thornton | |
| 3,875,337 A | 4/1975 | Bradley | |
| 4,319,081 A | 3/1982 | Martin et al. | |
| 4,424,511 A | 1/1984 | Alberts, Jr. | |
| 4,529,873 A | 7/1985 | Ballmer et al. | |
| 4,529,973 A | 7/1985 | Blamberg | |
| 6,686,839 B2 | 2/2004 | Chou et al. | |
| 7,003,123 B2 | 2/2006 | Kanevsky et al. | |
| 7,986,231 B1 | 7/2011 | Bentley et al. | |
| 8,194,866 B2 | 6/2012 | Smith | |
| 9,805,581 B2 | 10/2017 | Scheper et al. | |
| 10,115,293 B2 | 10/2018 | Scheper et al. | |
| 2002/0097885 A1 | 7/2002 | Birchfield et al. | |
| 2002/0145521 A1 | 10/2002 | Chou et al. | |
| 2002/0186129 A1* | 12/2002 | Rebello | G08B 21/182 340/540 |
| 2003/0002688 A1 | 1/2003 | Kanevsky et al. | |
| 2003/0154673 A1 | 8/2003 | MacGregor et al. | |
| 2004/0194669 A1 | 10/2004 | Forslund, III et al. | |
| 2005/0152565 A1 | 7/2005 | Jouppi et al. | |
| 2007/0011040 A1 | 1/2007 | Wright et al. | |
| 2009/0052677 A1 | 2/2009 | Smith | |
| 2009/0085873 A1 | 4/2009 | Betts et al. | |
| 2013/0002425 A1 | 1/2013 | Hatch et al. | |
| 2013/0329863 A1* | 12/2013 | Bentley | H04M 3/40 379/32.01 |
| 2014/0270284 A1* | 9/2014 | Luna | H04R 27/00 381/303 |
| 2014/0362999 A1 | 12/2014 | Scheper et al. | |
| 2015/0036832 A1 | 2/2015 | Usher et al. | |
| 2019/0043338 A1 | 2/2019 | Scheper et al. | |

\* cited by examiner

SOUND DETECTION AND ALERT SYSTEM FOR A WORKSPACE

CROSS-REFERENCE TO RELATED APPLICATIONS

This application is a continuation of U.S. patent application Ser. No. 16/144,775, filed Sep. 27, 2018, which is a continuation of U.S. patent application Ser. No. 15/720,461 filed Sep. 29, 2017, and issued as U.S. Pat. No. 10,115,293 on Oct. 30, 2018, which is a continuation of U.S. patent application Ser. No. 15/099,113 filed Apr. 14, 2016, and issued as U.S. Pat. No. 9,805,581 on Oct. 31, 2017, which is a continuation of U.S. patent application Ser. No. 13/911,654 filed Jun. 6, 2013. The contents of these applications are hereby incorporated by reference as if set forth in their entirety herein.

STATEMENT REGARDING FEDERALLY SPONSORED RESEARCH OR DEVELOPMENT

Not applicable.

BACKGROUND OF THE INVENTION

The field of the invention is sound monitoring and alerting system, and more specifically a sound detection and alerting system for use in a designated area such as a workspace, an office, a conference room, or the like, for indicating when at least one characteristic of sounds exceeds a threshold level.

The office furniture industry is always evolving to meet the needs of customers. Communication is an important vehicle for human interaction in personal and business settings to convey information. In a time when electronic communication bombards individuals, people are increasingly returning to interpersonal communication with colleagues, customers and friends through face-to-face meetings, telephone calls, video chats, and other forms of direct verbal communication.

In many office settings, however, direct communication through one of the aforementioned methods is challenging for many reasons. In particular, offices, cubicles, conference rooms, and workspaces pose particular challenges with respect to the transmission of sound. In many work environments furniture artifacts are designed to stess, there is an open space work place, wherein the physical boundaries between offices are non-existent, minimal, temporary, or only provide a partial boundary that delineates individual workspace. In other instances, even where boundaries such as walls are provided to separate workspaces, boundaries often do not provide sufficient sound-proofing if the volume of a person's voice within a space exceeds a threshold level.

Further, in many instances, individuals are unaware of the volume of their voices and the sound that is being transmitted to adjacent spaces. This lack of awareness causes many issues in the workplace. For example, high volume speech often disturbs or disrupts individuals in adjacent or nearby workspaces. As another example, information disclosed in private or confidential conversations is not protected and may be inadvertently disclosed when people speak at high volume. As one other instance, conversations and/or work may be interrupted due to sound or noise from conversations that may be taking place in adjacent workspaces.

Existing work places are often designed to attempt to overcome the aforementioned problems through the use of various tools. In particular, some workplaces construct walls or barriers to define enclosed private spaces for workers. Such barriers typically extend from floor to ceiling and separate a workspace from adjacent workspaces. Workplaces may further include soundproofing material in the barriers and/or ceiling to further buffer sound that is emitted from workspaces.

In other instances, workplaces use other methods to try to control sounds transmitted between adjacent spaces. For example, many workspaces utilize noise generating systems to cover up or distort sound waves and noises. Such systems frequently emit sounds designed to cover up or mask sound generated by speech.

In still other workspaces, noise-cancelling systems are used to filter or cancel sound waves as they travel out of the vicinity of the workspace. The sound canceling systems are typically designed to emit white noise at frequencies that should cancel out sound waves before the sound waves reach adjacent workspaces. The sound canceling systems typically utilize a plurality of strategically located speakers (e.g., above a doorway) and a controller that is designed to control the white noise in ways calculated to cancel sound.

While existing systems and techniques for reducing noise travel among adjacent spaces work well in some applications, unfortunately known systems have several shortcomings. First, the option to place barriers between adjacent workspaces is not available in some cases where an open seating or workspace design is desired. Further, even where walls or other physical barriers can be used, such barriers often times do not block all sound. In these cases, where a space user perceives that walls are sound proof, the problems associated with high volume sound carrying from one space to another can be exacerbated as a space user may be encouraged to increase her volume in the "sound proof" space.

Second, where noise cancelling and generating systems are used, they are typically utilized throughout an entire workspace in a blanket manner and do not target noise levels near specific individuals or in specific workspaces. As a result, the noise cancelling systems are ineffective for use with various levels of sound that travels between one space and adjacent spaces.

Third, persons within a space have no way of knowing if the volume of their voices or other sound generating devices within their spaces is at a level that can be heard from outside their spaces. In this case, where a person believes a first space they occupy is sound proof, the person will do nothing to temper the volume of her voice in the first space potentially resulting in disclosure of private information to other spaces or a condition in which persons in adjacent spaces are at least bothered by sounds emanating from the first space. In other cases, where the person in the first space believes that the first space is not sound proof, the person in the first space will likely over-react and keep her voice and sounds in the space at an extremely low volume to avoid inadvertent disclosure or a bothersome condition for adjacent space users. Unnecessary low volume can adversely affect intended communication.

BRIEF SUMMARY OF THE INVENTION

It has been recognized that the disadvantages associated with sound levels in a workspace can be substantially overcome by providing a sound detection and alert system that includes at least one sensor electronically connected to an output signaling device. The sensor is positioned in the vicinity of one or more individuals speaking within a space and may be designed to monitor sound levels being transmitted there from. The sensor transmits an electrical signal to the signaling device. The signaling device may include a visual display unit having a lighting scheme designed to alert the individual(s) speaking of the level of sound being generated by speech or more generally to indicate the level of sound being generated within a space associated with the individual. The individual(s) speaking may then adjust the volume of speech or sound in the space in response to the lighting scheme in an effort to reduce the volume of sound emanating from the space into adjacent spaces.

Consistent with the above, some embodiments include an alert system for generating a signal indicating at least one aspect of sound within a workspace environment, the system comprising at least a first sensor positioned one of within and proximate a workspace, the at least a first sensor sensing at least one aspect of sound generated within the workspace and generating a signal indicating the at least one aspect, a communication device located within the workspace, the communication device configured to generate a signal perceivable within the workspace and a processor receiving signals from the at least a first sensor and linked to the communication device, the processor programmed to perform the steps of identifying when the at least one aspect exceeds a threshold value and driving the communication device to indicate that the at least one aspect exceeds the threshold value.

In some cases the at least one aspect of sound generated within the workspace includes volume of the sound generated. In some cases the at least one sensor is positioned within the workspace. Other embodiments further include an interface usable to set at least the threshold value.

In some cases the communication device includes a display screen and wherein the interface is presented via the computer display screen. In some cases the at least one sensor is positioned outside the workspace. In some embodiments the at least one sensor includes a first sensor located outside the workspace and at least a second sensor located within the workspace. In some embodiments the processor uses signals from the first and second sensors to identify when the at least one aspect exceeds the threshold value. In some cases the communication device includes at least one illumination device that is illuminated to indicate that the at least one aspect exceeds the threshold value.

In some embodiments the communication device includes at least a second illumination device, the processor further programmed to illuminate the second illumination device when the at least aspect is below the threshold level. In some cases the communication device includes a plurality of illumination devices and wherein the processor is programmed to identify when the at least one aspect is within different ranges of values and to illuminate different subsets of the illumination devices to indicate that the at least one aspect is within the different ranges. In some cases each illumination device subset includes a different one of the illumination devices.

In some cases a first illumination device corresponds to a low sound level, a second illumination device corresponds to an intermediate sound level, and a third illumination device corresponds to a high sound level. In some embodiments the workspace is defined at least in part by partition walls that separate the workspace from adjacent workspaces. In some embodiments the workspace is a personal office space.

In some embodiments the office space includes at least one work surface for use by a space occupant and wherein the at least one communication device includes a visual communication device that is mounted adjacent the work surface for easy viewing by the space occupant at the work surface. In some cases the workspace is a conference space. In some cases the workspace includes at least one partition wall and wherein the at least one sensor is mounted within the at least one partition wall.

Other embodiments include an alert system for generating a signal indicating at least one aspect of sound within a workspace environment, the system comprising a workspace including at least one furniture artifact that encourages a space occupant to orient within the workspace to face a first direction, at least a first volume sensor positioned one of within and adjacent the workspace for sensing the volume of sound generated within the workspace and for generating a signal indicating when the volume exceeds a threshold volume level and a visual communication device located within the workspace and within a field of view aligned along the first direction, the communication device configured to generate a visual signal perceivable within the workspace whenever the volume exceeds the threshold volume.

In some cases the communication device includes at least one illumination device. In some cases the sensor is located within the workspace. In some cases the furniture artifacts include at least one work surface having at least one edge for accommodating an occupant and wherein the communication device is spaced away from the at least one edge and above the work surface.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE DISCLOSURE

One or more specific embodiments of the present disclosure will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
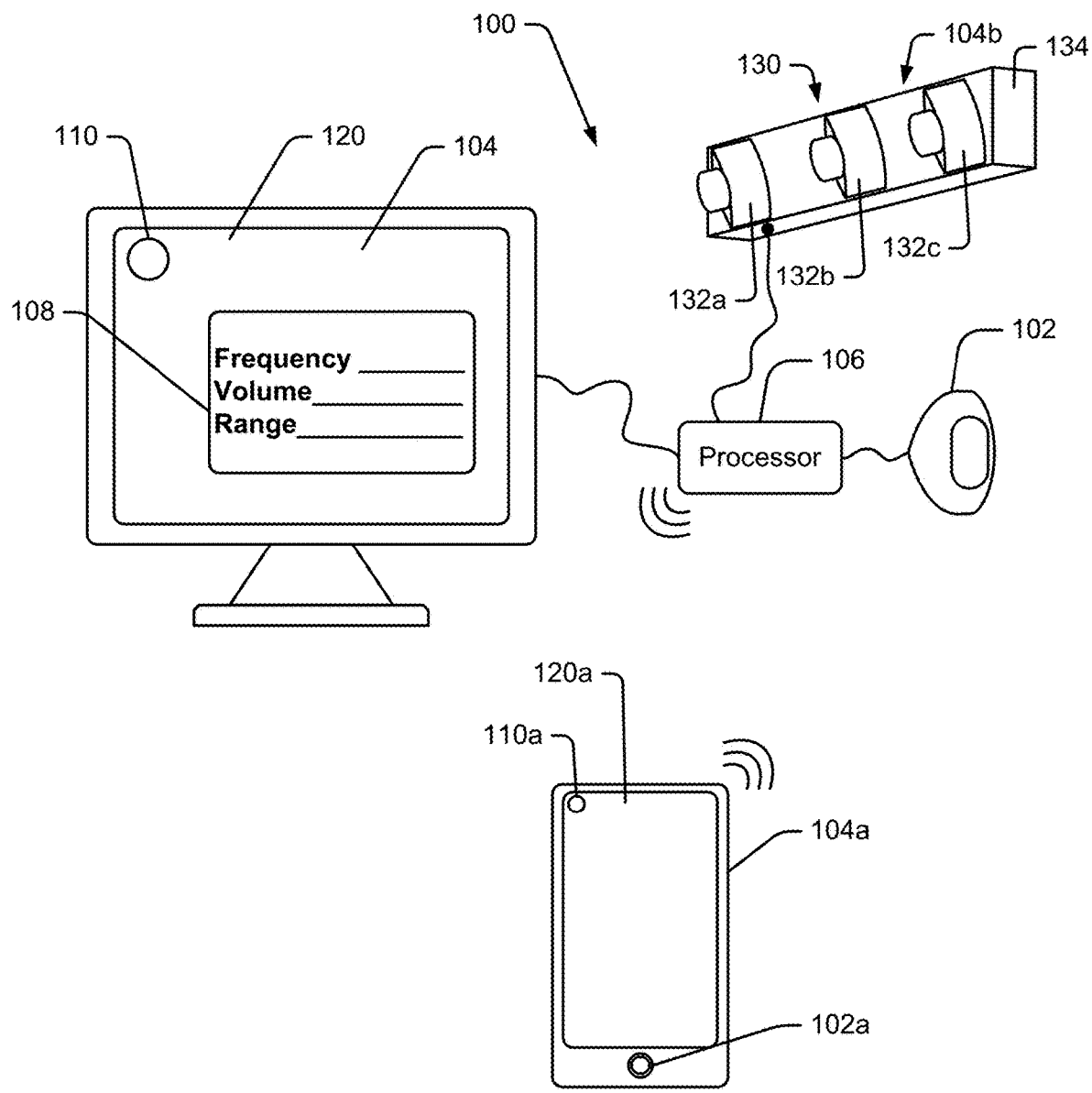
FIG. 1 is a schematic view of a sound detection and visual alert system including at least one sensor electrically connected to a visual display unit that is consistent with at least some aspects of the present invention.

Referring now to the figures wherein like reference numerals correspond to similar elements throughout the several views and more specifically referring to FIG. 1, an exemplary sound detection and alert system 100 includes at least one sensor 102, a controller or processor 106 and a communication device 104. In at least some embodiments sensor 102 may include an acoustic sensor designed to detect sound waves. A typical acoustic sensor 102 measures one or more sound characteristics (e.g., sound pressure levels) and converts the sound wave data into a signal indicating the characteristic. Sensor 102 may detect an objective measure of sound such as a measurement of loudness of speech in decibels or intensity. In one particular instance, the sensor 102 detects frequency in the range of that of a human voice. For example, the sensor 102 preferably detects frequency in the range between about 20 Hz and 20,000 Hz and may detect a band of frequencies within the larger range (e.g., 250 Hz to about 4,000 Hz).

Consistent with the discussion herein, one suitable sensor 102 for use in the sound detection and visual alert system 100 is a microphone. In one instance, a suitable microphone is an electret condenser microphone that includes, for example, an membrane, a metal electrode, and a field effect transistor. In another instance, a sensor 102 includes a microphone that detects changes in decibel level, which triggers a high pulse to be sent through a signal pin of the sensor 102. One suitable sensor 102 and associated microprocessor, for example, is the Sound Impact Sensor by Parallax, Inc. (Rocklin, Calif.). Other useful sensors for use in the sound detection and visual alert system 100 include electrostatic sensors, piezoelectric sensors, and other sensors that are capable of detecting sound produced by the human voice. Sensor 102 may include a microphone that is provided for other purposes. For instance, microphone 102 may be provided as part of a larger telepresence system along with a telepresence camera (not illustrated) and a display screen (e.g., see 120 in FIG. 1) used to facilitate telepresence activity. In other embodiments microphone 102 may be part of a conferencing phone system or may include a stand alone microphone or other sensor dedicated to the sensing and alert system 100.

Sensor 102 may include one or more sensors 102 in some embodiments and sound from any one of multiple sensors 102 may be used to drive the alerting function of system 100. In other cases sounds sensed by multiple sensors 102 may be processed to identify conditions required to generate an alert signal.

Figure 2:
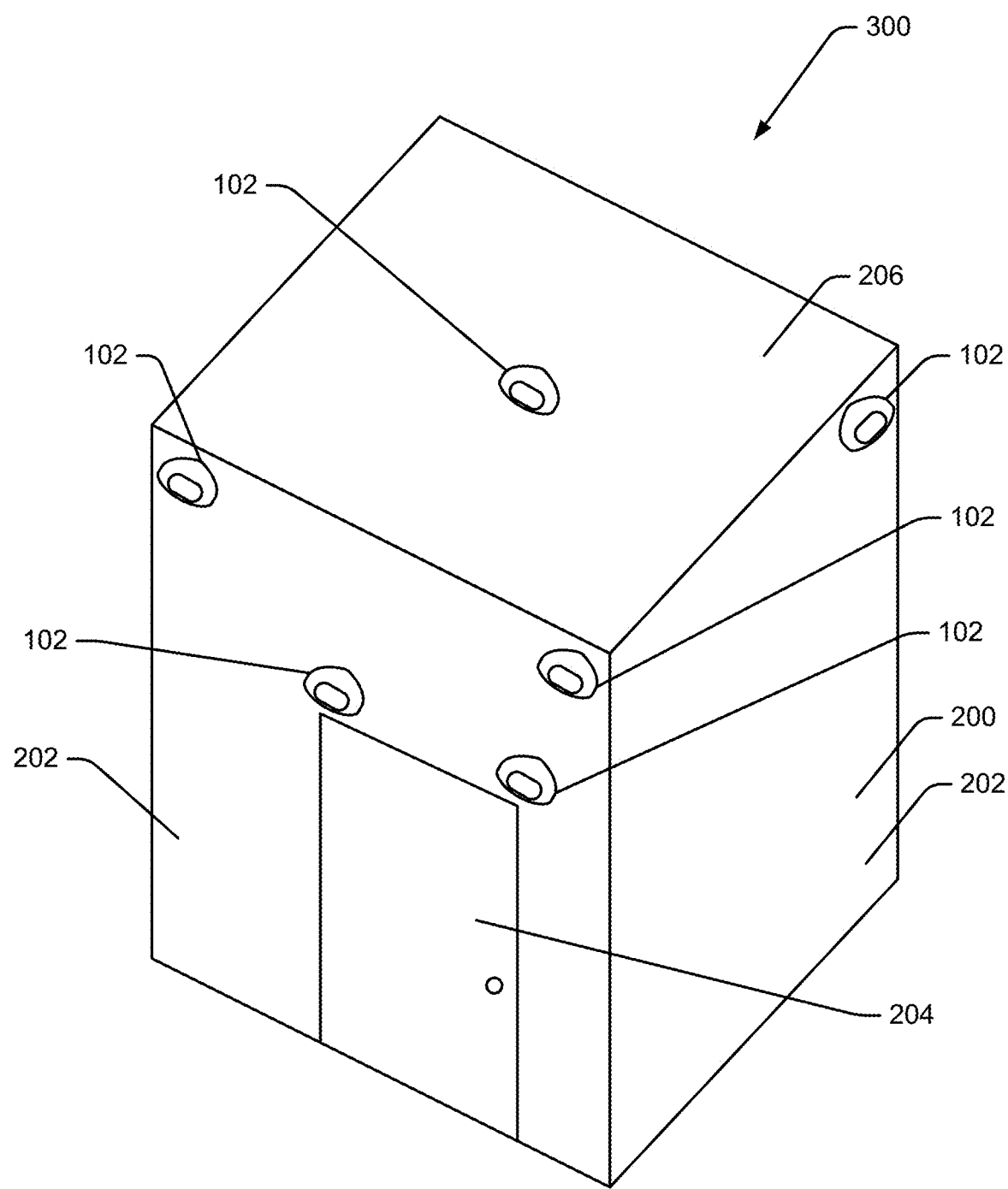
FIG. 2 is a schematic view of barriers that form external structure that defines a workspace that is consistent with at least some aspects of the present invention.
Figure 3:
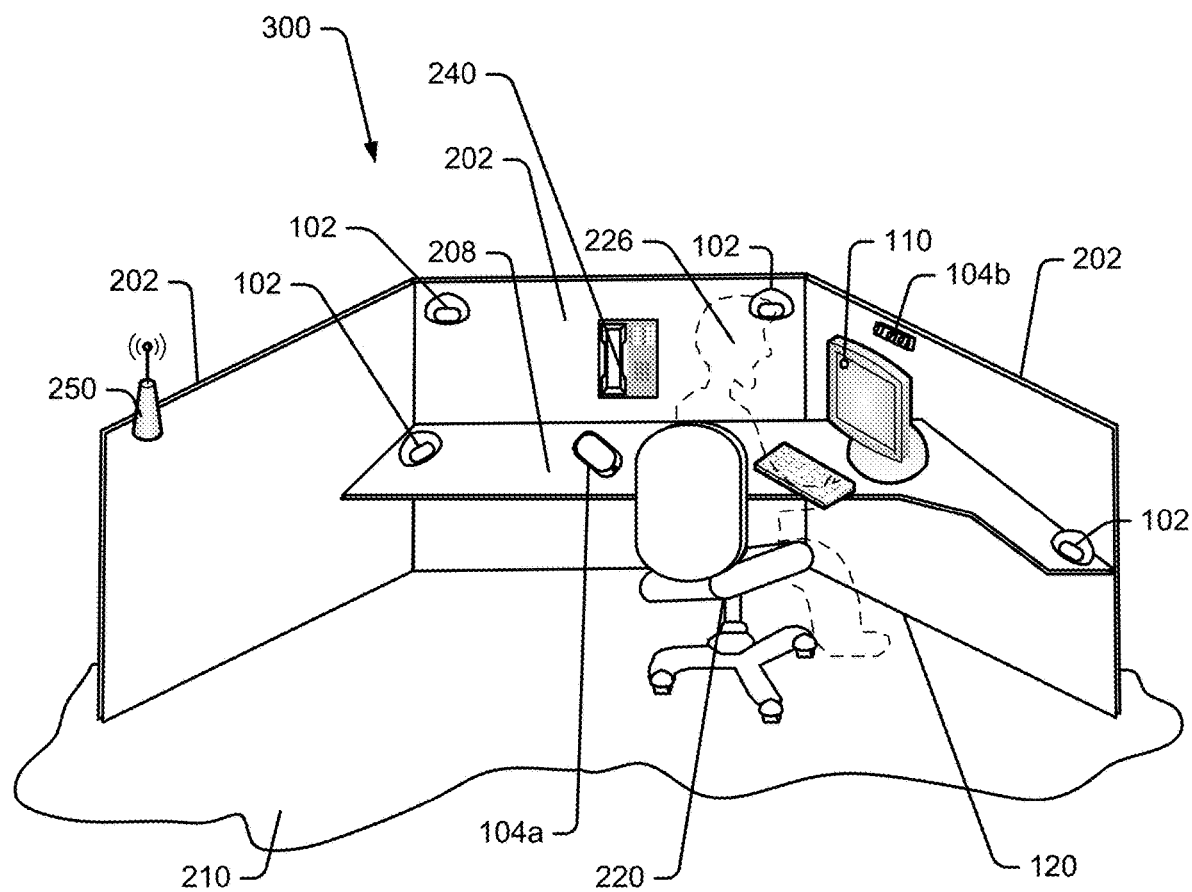
FIG. 3 is a schematic view of internal artifacts of the exemplary workspace shown in FIG. 2.

Referring to FIGS. 2 and 3, an exemplary workspace 300 is defined by boundaries 200 including a floor structure 210, walls 202, a ceiling 206 and a door 204 which may close an egress. Furniture artifacts are located within workspace 300 including a credenza 208 that forms a worksurface and a computer including display 120 that is supported on the worksurface. A chair 220 is provided within space 300 for a space 300 occupant (see phantom 226 in FIG. 3).

Referring still to FIGS. 2 and 3, exemplary sensors 102 are shown in various locations within space 300 or adjacent space 300. For instance, in FIG. 3, sensors 102 are shown mounted to or built into wall structures 202 as well as resting on the worksurface 208 or mounted within worksurface 208.

In FIG. 2, sensors 102 are shown mounted to or built into external surfaces of walls 202, adjacent door 204 and within ceiling 206. Sensors 120 may further be built into or supported by other structure outside space 300.

Referring again to FIG. 1, processor 106 is designed to translate data captured by sensor 102 into an output signal which is in turn provided to device 104 to indicate a status of the signal generated by sensor 102. Processor 106 may be integrated with sensor 102 into a single device, or may be separate there from. Processor 106 is programmed to manage operational aspects of the overall sound detection and alert system 100.

In at least some embodiments, processor 106 includes operational parameters used to characterize loudness or volume of sound detected by sensor 102. For example, the volume of sound being detected may be classified as low, intermediate, or high. In one instance, the low sound level may be within a range between about 0 decibels to about 50 decibels, the intermediate sound level may be within a range between about 51 decibels to about 80 decibels, and the high sound level may be within a range between about 81 to about 120 decibels. In a different instance, the low sound level is between about 0 decibels to about 20 decibels, the intermediate sound level is between about 21 decibels to about 70 decibels, and the high sound level is greater than about 80 decibels. In still a further instance, the low sound level is between about 0 decibels to about 40 decibels, the intermediate sound level is between about 41 decibels to about 70 decibels, and the high sound level is between about 71 decibels to about 120 decibels. The sound levels provided herein are guidelines, and the actual levels of sound may vary according to various parameters including the size of a workspace being monitored, other devices generating noise in the vicinity of the workspace, and/or other environmental factors which can be considered during process or programming.

Referring still to FIG. 1, exemplary communication device 104 includes a display screen 120 that includes a visual indicator 110 presented on the screen. The appearance of indicator 110 may be altered to indicate different volume conditions or other sound characteristics monitored by processor 106. For instance, in some embodiments indicator 110 may be colored green to indicate a volume that is below a threshold volume at which sound is discernible from outside a space associated with sensor 102 and may be colored red to indicate a relatively high volume associated with sound that is likely hearable from outside the space. In other embodiments indicator 110 may be controlled to simply indicate when any sound is sensed by sensor 102. For instance, where a sensor 102 is located in a space outside and adjacent or proximate a space in which sound is being monitored, any sound picked up by sensor 102 that is attributed to the monitored space may be indicated via indicator 110.

Referring again to FIGS. 1 and 3, display 120 may be mounted within a conference or other space 300 associated with sensor 102 and juxtaposed within the space to be viewed by one or more space users.

In other cases, display 120 may be associated with a person's laptop, a smart phone, a pad type computing device or other device. In this regard, see again FIG. 1 where a pad type computing device or smart phone 104a is shown operating as a communication device where device 104a includes a display screen 120a and an indicator 110a on the screen 120a. Here, device 104a may be used to download and run a sound sensing/alert application whenever in a space 300 where sensor 102 and processor 106 drive device 104a in a wireless fashion using Bluetooth or some other wireless communication protocol.

Referring again to FIG. 1, in other embodiments a communication device 104b may include a light source 130 to indicate sound characteristics. Light source 130 may include a light bulb (not shown), one or more light-emitting diodes (LEDs) 132a, 132b and 132c, or other illumination devices. Where device 104b includes multiple LEDs or other illumination devices, different LEDs or subsets thereof may be used to indicate different sound characteristics.

Figure 4:
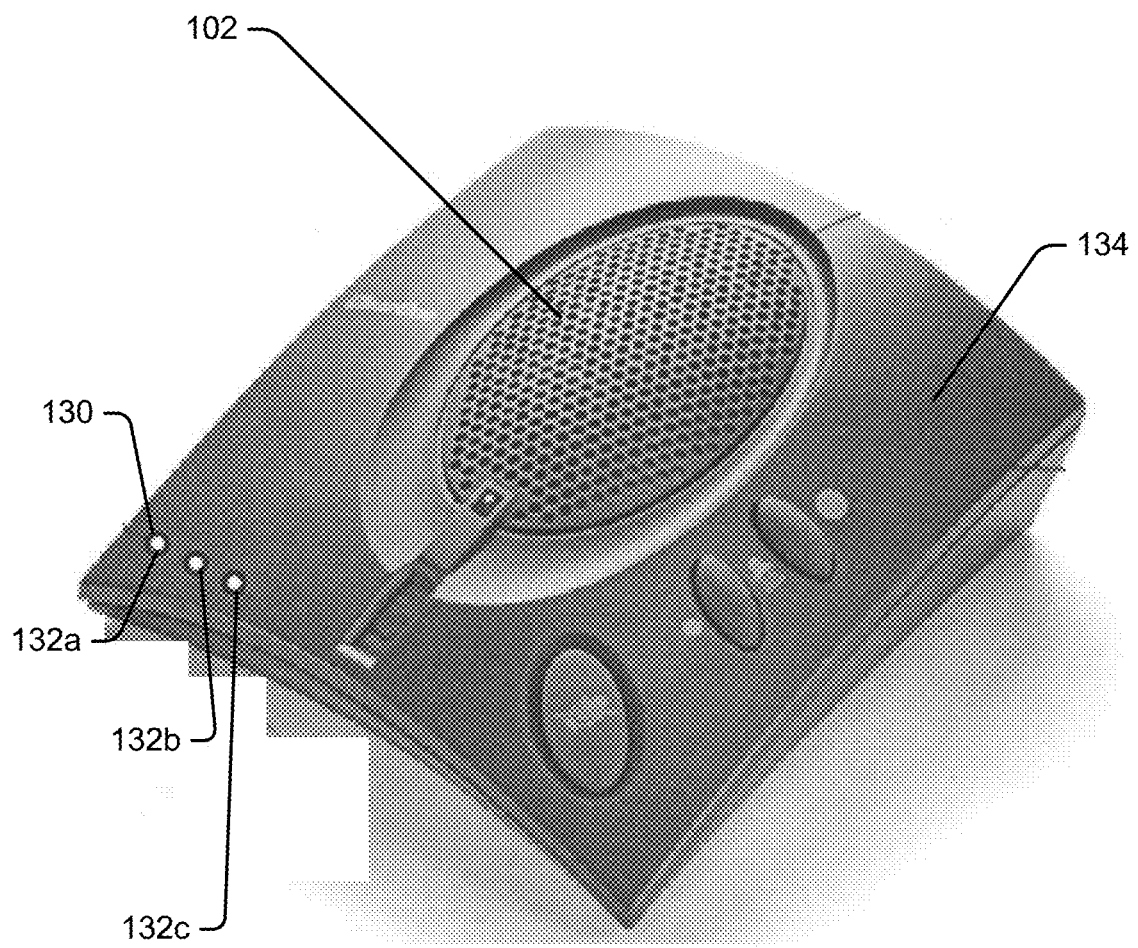
FIG. 4 is a schematic view of a different embodiment of a sound detection and visual alert system having a sensor in communication with a controller and a plurality of light-emitting diodes disposed in a housing.

Referring to FIG. 4, at least some embodiments may include a housing 134 in which a sensor 102, processor (not illustrated in FIG. 4 but see again 106 in FIG. 1) and output or communication device 130 are all housed. Exemplary communication our output device 130 includes three LEDs 132a, 132b and 132c that together provide output signals to indicate different sensed sound conditions. For instance, in some cases a first LED 132a may be illuminated green to indicate that the system is operating properly and that the volume of sound being sensed is below a threshold level at which the volume is too high. When the volume reaches a level within a range that may be too high but is still likely low enough to not be discernible from adjacent spaces, a second LED 132b may be illuminated. When the volume of the sound sensed reaches a level that is too high and that is likely to be heard in adjacent spaces, third LED 132c may be illuminated to indicate that a person within the space should reduce the volume of sound generated in the space.

In other cases one or more communication device LEDs may also be controlled to indicate when volume of sound is too low for optimal communication. For instance, in the context of a telepresence system, when the voice of a space 300 occupant is below a lower threshold optimal for audio communication, one or more LEDs 132a-132c may be illuminated to encourage the occupant to speak up. Indications may be via different LEDs or by changing the color of one or more LEDs.

In any of the configurations discussed herein, it is contemplated that system 100 operating parameters may be set in several different ways. For example, as indicated above, where one or more sensors 102 are located outside a space 300 (see again FIG. 2), processor 106 may be programmed to indicate any sound having a volume greater than a threshold level. As another instance, where at least one sensor 102 is located within a space 300 and at least one sensor 102 is located outside the space 300, signals from both sensors may first be used to identify and distinguish sound generated within space 300 from sound generated outside space 300 and second to identify any sound from within space 300 having a volume that exceeds a threshold level. To this end, processor 106 may be programmed to correlate sounds sensed within space 300 with sounds sensed outside space 300 to discern sounds generated in space 300 and may then process the correlated sound from outside space 300 to identify an alert condition.

As another example, it is contemplated that a system 100 may be used with a specific type of wall and ceiling structure having known dimensions and known sound blocking characteristics where at least sensors 102 may be integrated into the structure at known locations. In this case, the processor 106 may be pre-programmed to indicate an alert when a specific set of sound characteristics occurs. For instance, Steelcase Inc. manufactures glass and other types of architectural wall structures that can be used to configure barriered workspaces. In many cases these wall structures are configured in standard use configurations for specific applications. For instance, wall structures may be configured to provide a standard eight by ten foot office space with a specific set of furniture artifacts arranged in a specific way to support a single office occupant. In this case, because the wall structures are known, sound absorbing characteristics may also be known. To this end, see FIG. 8 that includes glass and other walls 202 and a glass door 204 that form a telepresence space 402 for use by a single occupant to participate in a telepresence activity using a portable smart phone 400. As illustrated, a stand or other support device 408 is provided within space 402 to support device 400 in an optimal orientation to facilitate a telepresence activity. In FIG. 8, one sound sensor 102 is shown mounted to an internal surface of one of the walls. Here, a light panel 104c is provided as a communication device where brightness or color of the light may be controlled by a processor to indicate volume alert conditions. Thus, panel 104c may illuminate with white light to indicate a suitable volume below a threshold and the color of the light may be changed to be more red as volume increases above a threshold level. By building one or more sensors into the wall structures or by locating one or more sensors at specific locations with respect to the standard configuration, either volume thresholds can be calculated or the thresholds may be identified empirically for the standard structure and used to program processor 106. Other standard space configurations and sound thresholds are contemplated including other size office spaces, different size conference rooms.

As still one other example, where at least one sensor 102 is located inside a space 300 (see again FIG. 2), after the space is configured, a commissioning procedure may be performed whereby a temporary sensor 102 is located outside space 300 and is used to identify a volume sensed by the sensor 102 within space 300 that correlates to a threshold volume sensed by the temporary sensor. After the correlated volume sensed by the space 300 sensor is identified, that volume may be used by processor 106 as the threshold value.

Other more complex commissioning systems may employ a speech recognition engine to process sound sensed outside a space 300 to identify a higher volume required for recognizable speech to travel out of a space 300. Here it has been recognized that physical barriers like a wall operate as filters for certain frequencies of sound and therefore, even if sound can be heard, often times words associated therewith cannot be discerned. Thus, until an engine can recognize speech, volume may be increased without affecting confidentiality.

In other cases a commissioning procedure may be more manual where a person who installs a system 100 may control a sound generating device within space 300 to increase volume while being located outside space 300 and the person may manually perceive an automated voice recording as the volume is increased and may manually select one or more volume thresholds for programming a processor 106.

As still one other example, referring again to FIG. 1, an interface 108 for system 100 may be provided via screen 120 for selecting various sound characteristics used by processor 106 to drive the alerting application. Exemplary settable parameters may include frequencies to sense, threshold volume levels to identify, a range of distance at which speech should be non-discernible, etc. Other parameters may include space characteristics that processor 106 can use to calculate volume thresholds. For instance, space 300 dimensions may be specifiable, types of barrier constructions (e.g., wall types, insulation types, whether or not barriers are floor to ceiling, ceiling structures, etc.) may be specifiable, etc.

Figure 6:
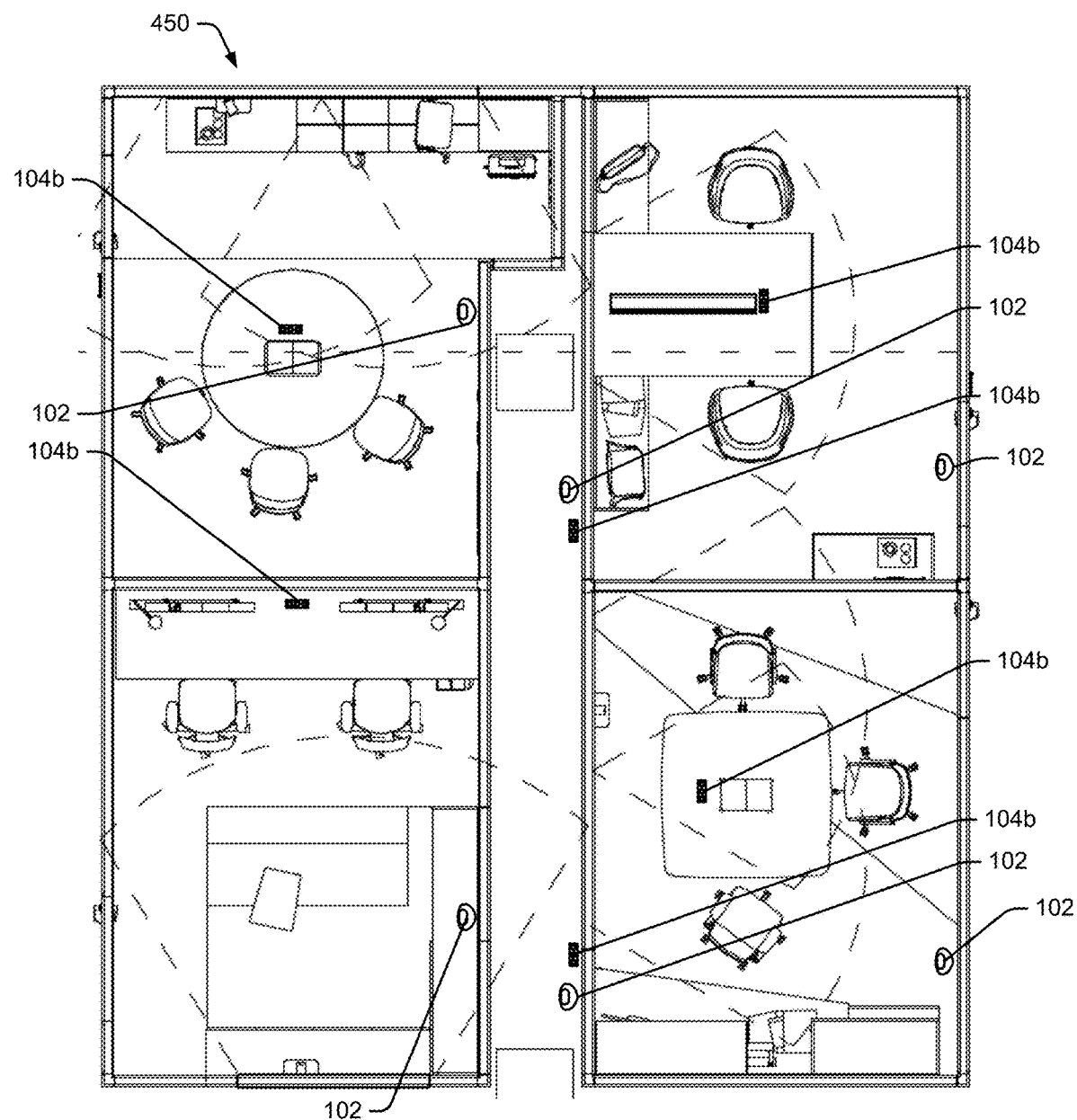
FIG. 6 is a plan view of a conference space floor plan showing sensors and communication devices located in various public and semi-private spaces.

In at least some embodiments, in addition to providing systems 100 in office spaces, conference spaces and other spaces in which formal and generally private communications occur, systems 100 or at least components thereof may also be provided within more public spaces such as a public hallway outside conference spaces. In this case, referring to FIG. 6 that shows a conference space floor plan 450, sensors 102 in the hallway or within adjacent more private spaces may be used to drive communication devices 104b (see also FIG. 1) located in the hallway to indicate to persons in the hallway when volume in the hallway exceeds one or more thresholds. The indication should encourage persons in the hallway to reduce the volumes of their voices. Here, multiple sensors in private spaces may be used to identify hallway noise volume and to drive the hallway communication devices 104b. Other sensors in the private spaces and in the hallway may be used to obtain sound volumes and to drive indicators in the private spaces. Thus, one or more sensors may drive one or more communication devices and combinations of sensor signals may be used to drive indicators in either private or public spaces.

Referring again to FIG. 3, sensors 102 in at least some embodiments may not be able to distinguish the voice of a space 300 occupant from other sound generated within space 300 such as, for instance, the voice of a remote person conferencing with the occupant via a speaker feature of a space telephone 240. In this case a space occupant 226 would have to recognize via a communication device 104b or a screen indicator 110 that a speakerphone volume is too high and would then manually turn down the volume to an appropriate level. In other embodiments processor 106 may be linked to the speaker phone 240 or to other telepresence equipment (e.g., a computer) and may automatically turn down the volume of sound generated equipment to a level below a threshold.

In still other embodiments, the sound sensing/alerting method may be at least substantially performed via a smart phone or other portable device used by a space occupant. In this regard, it has been recognized that a smart phone or other similar device includes all hardware required to perform a sensing/alerting process. Referring again to FIG. 3, after a sensing/alerting application has been downloaded to a portable device 104a when a device user 226 brings device 104a into a space 300, location of device 104a may be triangulated or otherwise determined (e.g., via a sensor or indicator adjacent a space egress) and volume or other threshold values may be provided automatically to device 104a via a wireless access point 250 or the like where the threshold values are specific to the space 300 occupied. Here, brief instructions may instruct the device use to place device 104a at a specific location such as in front of the occupant and within 3 to 5 feet of the occupant's face. A device 104a processor may then obtain sound signals from a device microphone 102a, process the sound to identify when volume exceeds a threshold value and indicate via an on screen indicator 110a or even a space mounted indicator 104b when the value is exceeded.

Figure 5:
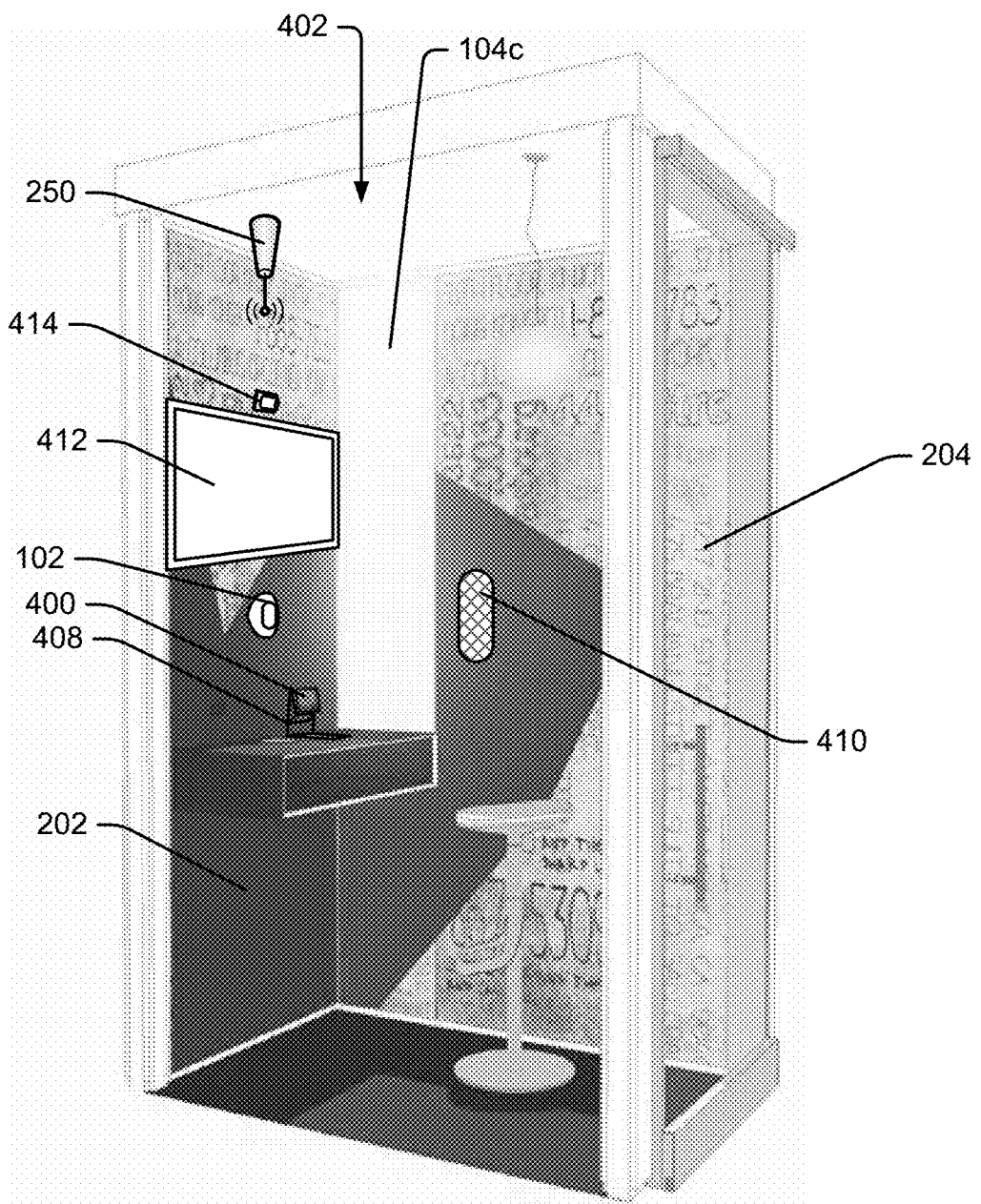
FIG. 5 is a schematic view of a single person telepresence system that is consistent with at least some aspects of the present invention.

In some embodiments furniture artifacts within space 300 may be configured to encourage a space occupant to orient toward a communication device within the space during sound generating activities. For instance, in a personal space 402 used for telepresence activities as in FIG. 5, via a display screen, device 104c may be mounted above and to the side of screen to be within the field of view of a user facing the screen. In other cases such as a conference room including a large conference table having a defining edge around which conferees can gather communication devices (e.g., 104b) may be mounted within the table top structure within a field of view associated with people about the top structure.

Referring again to FIG. 5, in still other embodiments, when a portable device 400 is associated with a space 402, device 400 may wirelessly (e.g., via an access point 250) or in a wired fashion link to various components within the space automatically so the other components can automatically be used to enhance activities performed using device 400. For instance, in addition to sensor 102 and communication device 104c, other space 402 components may include one or more speakers 410, a high definition larger display screen 412, a high quality camera 414 and other devices. Here, for instance, device 400 may be used to drive a telepresence activity where all the other components including sensor 102 and device 104c cooperate to enhance the overall experience.

In at least some cases where sensors 102 are located both inside and outside a work space (see FIGS. 2 and 3), the system processor may be programmed to have an initial volume threshold driven by sound in the space where the initial threshold volume level may be raised as the volume of sound outside the space increases. Here, where there is no appreciable sound outside the space, the initial volume threshold level may be maintained and a communication device 104, 104a, 140b, etc., may indicate when volume in the space exceeds the initial threshold. However, if there is a lot of noise outside the space, the initial volume threshold may be raised to a different level calculated to result in a case where the combination of sound deadening aspects of barriers and the sound outside the space should block any discernible speech outside the space.

While communication devices 104, 104a, 104b are described as being visual, in other embodiments a device 104 may include a speaker for generating an audio alert or may include both audio and visual components.

While the invention may be susceptible to various modifications and alternative forms, specific embodiments have been shown by way of example in the drawings and have been described in detail herein. However, it should be understood that the invention is not intended to be limited to the particular forms disclosed. Thus, the invention is to cover all modifications, equivalents, and alternatives falling within the spirit and scope of the invention as defined by the following appended claims.

To apprise the public of the scope of this invention, the following claims are made:

What is claimed is:
1. A workspace assembly, the assembly comprising:
a plurality of sound sensors including at least first and second sound sensors located in first and second spaces within a facility, respectively;
at least one communication device located within one of the first space and the second space; and
a processor in communication with the sound sensors and the communication device, the processor adapted to compare at least some characteristic of sounds in at least a subset of the first and second spaces to identify a particular space from which the sound emanates and to compare at least some characteristic of the sound emanating from the particular space to at least one threshold characteristic value and to provide a signal via the at least one communication device based on results of the comparison, and wherein the processor is further adapted to adjust the at least one threshold characteristic value to be different at different times.

2. The workspace assembly of claim 1 wherein the processor adjusts the at least one threshold characteristic value based on at least one characteristic of sensed sound in a space outside the particular space.

3. The workspace assembly of claim 2 wherein the at least some characteristic and the at least one characteristic are each sound volume.

4. The workspace assembly of claim 1 further including a plurality of wall structures defining a plurality of facility spaces including at least the first and second spaces wherein the wall structures at least partially separate adjacent spaces.

5. The workspace assembly of claim 4 wherein the at least one communication device is located in the first space.

6. The workspace assembly of claim 5 wherein the first space is a public space.

7. The workspace assembly of claim 5 wherein the first space is a private space.

8. The workspace assembly of claim 1 wherein the at least one threshold characteristic value includes at least one volume level.

9. The workspace assembly of claim 8 wherein the processor controls the at least one communication device to indicate when volume emanating from the particular space is below the threshold level.

10. The workspace assembly of claim 8 wherein the processor controls the at least one communication device to also indicate when the volume emanating from the particular space exceeds the threshold level.

11. The workspace assembly of claim 8 wherein the volume compared to the at least one volume threshold is detected using a sensor device located within the particular space.

12. The workspace assembly of claim 8 wherein the volume compared to the at least one volume threshold is detected using a sensor device located outside the particular space.

13. The workspace assembly of claim 1 wherein the processor and communication device and at least the first sensor are integrated into a single system component.

14. The workspace assembly of claim 13 wherein the single system component includes a device installed within the particular space.

15. The workspace assembly of claim 13 wherein the single system component includes a portable handheld device.

16. The workspace assembly of 1 wherein the communication device indicates three states including volume too high, volume too low, and volume within an acceptable range.

17. The workspace assembly of claim 1 wherein the communication device generates light to signal different states.

18. The workspace assembly of claim 17 wherein the communication device includes an LED that has a controllable color to indicate different states.

19. The workspace assembly of claim 1 wherein at least the first sensor is programmed to detect frequencies within the range of a human voice.

20. The workspace of assembly claim 19 wherein at least the first sensor is programmed to detect frequencies within the range between 250 Hz and 4 KHz.

21. The workspace assembly of claim 1 wherein a telepresence system is located in at least one of the first and second spaces and wherein the processor is further configured to, upon the sound within the at least one of the first and second spaces exceeding a threshold level, automatically turn down the volume of the telepresence system.

22. The workspace assembly of claim 1 wherein at least the first sensor is integrated into a wall structure.

23. The workspace assembly of claim 1 wherein at least the first sensor is integrated into an article of furniture.

24. The workspace assembly of claim 23 wherein the article of furniture includes a table having a table top and wherein the at least a first sensor is integrated into the table top.

25. The workspace assembly of claim 24 wherein the communication device is integrated into the table top.

26. The workspace assembly of claim 1 further including a second communication device, the first and second communication device located within the first and second spaces, respectively.

27. The workspace assembly of claim 26 wherein the first communication device indicates when sound volume within the first space exceeds a first threshold level.

28. The workspace assembly of claim 27 wherein the second communication device indicates when sound volume within the second space exceeds a second threshold level.

29. The workspace assembly of claim 28 wherein the first communication device also indicates when the sound volume within the first space is less than a third threshold level.

30. The workspace assembly of claim 1 wherein a display screen is located within the first space and wherein the communication device includes the display screen, the processor configured to provide the signal via a message presented via the display screen.

31. The workspace assembly of claim 1 wherein the first space includes a private office.

32. The workspace assembly of claim 1 wherein the first space includes a conference room.

33. The assembly of claim 1 wherein the processor compares a first sound characteristic to identify a particular space from which sound emanates and compare a second sound characteristic to a threshold characteristic.

34. A workspace assembly, the assembly comprising:
a plurality of sound sensors including at least first and second sound sensors located in first and second spaces within a facility, respectively;
at least one communication device located within one of the first space and the second space; and
a processor in communication with the sound sensors and the communication device, the processor adapted to compare at least some characteristic of sounds in at least a subset of the first and second spaces to identify a particular space from which the sound emanates and to compare a volume of sound emanating from the particular space to at least a first threshold volume level and to provide a first signal via the at least one communication device based on results of the comparison, and the processor also programmed to compare the volume of sound emanating from the particular space to at least a second threshold volume level and to provide a second signal different than the first signal via the at least one communication device when the volume of sound emanating from the particular space exceeds the second threshold volume level.

35. The workspace system of claim 34 wherein the processor controls the at least one communication device to indicate when volume emanating from the particular space is below the threshold volume level.

36. The workspace assembly of claim 34 wherein the at least one communication device is controllable to indicate a plurality of different states and wherein the step of comparing the volume to at least one threshold volume level includes comparing the volume of sound emanating from the particular space to ranges of volumes, the processor controlling the at least one communication device to indicate different states when the sound emanating from the particular space is within the different volume ranges.

37. A workspace assembly, the assembly comprising:
 a sound sensor system including at least a first sound sensor located within a first space in a facility that includes a plurality of spaces;
 at least one communication device located within a second space within the facility that is proximate the first space; and
 a processor in communication with the sound sensor system and the communication device, the processor adapted to compare a volume of sound originating within the second space and that is detected by the first sound sensor located in the first space to a threshold volume level and to control the communication device to present a signal based on results of the comparison.

38. The workspace assembly of claim 37 wherein the processor is further programmed to use sound signals sensed by the sensor system to identify sound emanating from the second space.

39. The workspace assembly of claim 38 further including identifying ambient sound volume in the first space and adjusting the threshold volume level as a function of the ambient sound volume in the first space.

40. The workspace assembly of claim 37 wherein the first space is a public space and the second space is a private space.

41. The workspace assembly of claim 37 wherein the first space is a private space and the second space is a public space.

42. The workspace assembly of claim 37 wherein the processor controls the at least one communication device to indicate when volume emanating from the second space is below the threshold level.

43. The workspace assembly of claim 37 wherein the processor controls the at least one communication device to indicate when the volume emanating from the second space exceeds the threshold level.

44. The workspace assembly of claim 37 wherein the processor is further programmed to use sound signals sensed by the sensor system to identify sound emanating from the second space.

45. The workspace assembly of claim 37 wherein the processor and the communication device are integrated into a single system component.

46. The workspace assembly of claim 37 further including a second sensor located within the second space, the processor further configured to use sound signals from the first and second sensors to identify sound emanating from the second space.

47. The workspace assembly of claim 46 wherein the processor uses sound signals from the first and second sensors to identify sound emanating from the second space by comparing volumes of the sounds from the first and second sensors.

48. The workspace assembly of 37 wherein the communication device indicates three states including volume too high, volume too low, and volume within an acceptable range.

49. The workspace assembly of claim 37 wherein the first sensor is programmed to detect frequencies within the range of a human voice.

50. The workspace assembly of claim 37 wherein the at least one communication device is integrated into an article of furniture.

51. The workspace assembly of claim 50 wherein the article of furniture includes a table having a table top and wherein the communication device is integrated into the table top.

52. The workspace assembly of claim 37 wherein there is a dividing wall structure between the first and second spaces.

* * * * *